United States Patent [19]
Von Holdt et al.
[11] 3,955,718
[45] May 11, 1976

[54] CONTAINER VIBRATOR MECHANISM FOR USE IN A VENDING MACHINE

[75] Inventors: John W. Von Holdt, Niles; George C. Stelyn, Crystal Lake, both of Ill.

[73] Assignee: United Ventures, Inc., Granite Falls, Minn.

[22] Filed: May 19, 1975

[21] Appl. No.: 578,511

[52] U.S. Cl. .................... 222/197; 222/361; 194/82
[51] Int. Cl.[2] .................... B65G 65/70
[58] Field of Search .......... 194/361, 362, 366, 344, 194/161, 216, 217, 221, 223, 225, 226, 228, 230, 231, 233, 196, 197, 199, 200, 202, 185, 243, 244, 245, 247, 346, 349, 350, 351, 325; 222/361, 362, 366, 344, 161, 216, 217, 221, 223, 225, 226, 228, 230, 231, 233, 196, 197, 199, 200, 202, 181, 185, 243, 244, 245, 247, 346, 349, 350, 351, 325

[56] References Cited

UNITED STATES PATENTS

| | | | |
|---|---|---|---|
| 778,479 | 12/1904 | Elliot | 222/161 |
| 2,237,189 | 4/1941 | Syverson | 222/245 |
| 3,393,838 | 7/1968 | Syverson | 222/361 |

*Primary Examiner*—Robert B. Reeves
*Assistant Examiner*—H. Grant Skaggs
*Attorney, Agent, or Firm*—Charles F. Pigott, Jr.

[57] ABSTRACT

A vending machine including a vibrating mechanism or thumper mechanism for vibrating a container of powdered material, said vibrating mechanism including a pivotally mounted spring-biased arm member actuatable to a cocked position by the movement of a slide mechanism and releasable to apply a blow to the container said vibrating mechanism and slide mechanism having interengageable portions for effecting movement of the arm member to the cocked position.

7 Claims, 3 Drawing Figures

CONTAINER VIBRATOR MECHANISM FOR USE IN A VENDING MACHINE

BACKGROUND OF THE INVENTION

This invention relates to a device for use in a vending machine, and more particularly, to a mechanism for vibrating a container of powdered comestible material in a powder dispensing machine.

Powdered materials contained in a dispensing container have a tendency to cake together at times and create an effect referred to as "bridging" where the lower end of the column of powder will assume an arch shape. Under such conditions, dispensing of the powdered material becomes difficult. It becomes desirable, therefore, to provide means for reducing the tendency of the material to cake.

SUMMARY OF THE INVENTION

It is therefore an object of this invention to provide in a vending machine a thumping mechanism for striking a container of powdered material to prevent bridging and caking of the powdered material and thereby facilitate dispensing the material.

Another object of this invention is to provide a device for vibrating a container of powdered comestible material to facilitate dispensing of that material.

Another object of the invention is to provide in a vending mchine a container vibrator arm which may be moved to a cocked position by the actuation of a slide mechanism in the vending machine, which slide mechanism is effective to engage a portion of the vibrator, move it to a cocked position and release it to strike the container.

It is still another object of this invention to provide a thumping mechanism of relatively simple design and construction, which is relatively inexpensive to manufacture, easy to operate, dependable in operation, and capable of performing properly after long periods of use.

By way of summary the invention provides a vibrating mechanism or thumper for use in a vending machine, which is used for dispensing powdered material from a container disposed in the vending machine. The vibrator mechanism includes a pivotally mounted articulated arm comprising a striker arm and power arm, the striker arm being spring biased toward a striking position. A spring loaded slide mechanism which is used in the dispensing operation actuates the vibrator mechanism during forward movement of the slide mechanism by engaging the power arm to move the striker arm to a cocked position and then by further movement is effective to release the power arm. This effects a release of the striker arm which under the influence of a biasing spring imparts a blow to the associated container to break up any bridging or caking of the powdered material which might have occured. Once the striker arm has been released, it moves back to a reset position.

The foregoing and other objects and advantages will be apparent from the following description taken in conjunction with the accompanying drawings.

DESCRIPTION OF THE DRAWINGS

FIG. 3 is a side view in elevation of the vibrator mechanism in a cocked position.

DESCRIPTION OF PREFERRED EMBODIMENT

Figure 1:
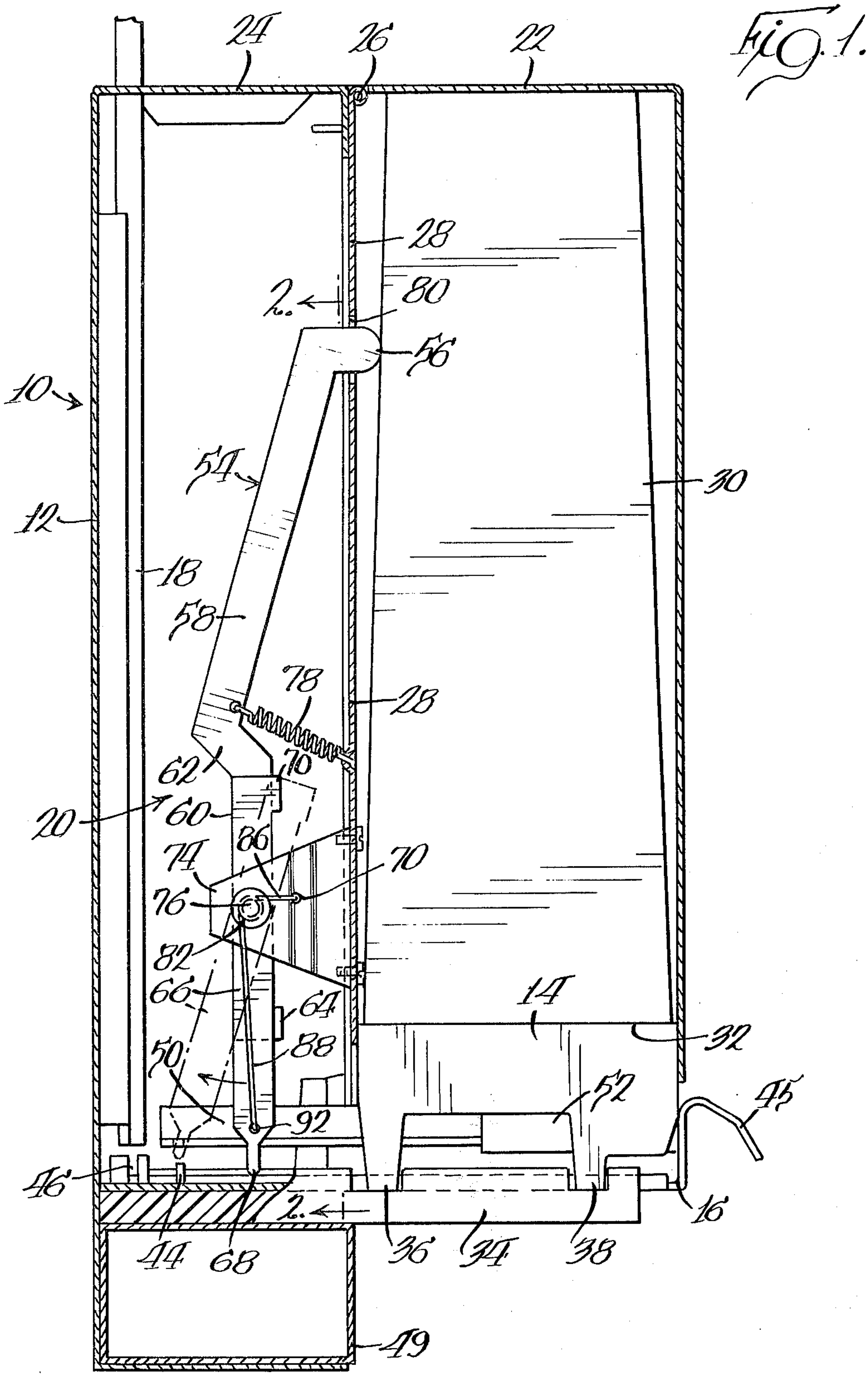
FIG. 1 is a cross-sectional view in elevation of a vending machine with a vibrator mechanism in accordance with principles of the present invention in contact with a container of powdered material and illustrating in phantom a power arm in a rearward position.

Referring now to the drawings wherein like reference numerals in the several views refer to similar parts 10 designates generally a vending machine for dispensing a powdered comestible material. The vending machine 10 illustrated herein with the exception of the thumper mechanism to which the invention herein relates is disclosed in greater detail in the copending U.S. application for patent Ser. No. 571,314 of John W. von Holdt and George C. Stelyn entitled Coin Operated Dispenser and filed on or about Apr. 23, 1975. The vending machine 10 comprises a housing 12, a dispensing receptacle 14, a horizontally movable spring-loaded slide mechanism 16, a coin chute 18 and a vibrator mechanism or thumper mechanism 20.

The housing 12 comprises a forward section 22 and a rearward section 24, the rearward section being hingedly attached to the forward section by a hinge 26. The forward and rearward sections are separated by a vertical wall 28 which is part of the rearward section 24 of the housing. The forward section 22 houses an elongated container 30 for storing powdered material which is to be dispensed from the machine. The bottom open end 32 of the container 30 is seated upon the dispensing receptacle 14.

The dispensing receptacle 14 has an upwardly facing opening upon which the open lower end 32 of the container 30 is seated. The receptacle 14 is seated upon a plastic slide carrier or mounting frame 34 by means of a pair of legs on each side of the receptacle, two of which are shown as 36 and 38.

The slide mechanism 16 is spring-loaded and is supported on the slide carrier or mounting frame 34 for horizontal sliding movement thereon period. As explained in detail in copending U.S. application Ser. No. 571,314 referred to above, the slide mechanism 16 includes a pair of compression springs 40 disposed in channels 42 which urge the slide 16 to a rearward position as shown in FIG. 1. An upwardly extending drive tab 44 is formed at the rear portion of the slide 16 and is adapted to engage a portion of the thumper mechanism 20 and acts as an actuating element when the slide 16 is moved to a forward position. Rearwardly of the tab 44 the slide 16 is provided with a coin pocket 46 into which a coin drops at the end of its passage through vertically disposed coin chute 18. The coin pocket 46 is positioned beneath and immediately adjacent the coin chute outlet when the slide 16 is in its extreme rearward or home position. During the forward movement of the spring loaded slide 16, achieved by pulling on handle 45, a coin 48 held in the coin pocket 46 engages the rearward end of stem 50 attached to the rear face of a dispensing member 52 forming part of the dispensing receptacle 14. This engagement effects a forward movement of the dispensing member 52 toward a dispensing position as shown in FIG. 3.

The slide carrier or mounting frame 34 is shaped to provide a coin channel 47 arcuate in cross-section. The coin channel 47 cooperates with the coin pocket 46 to drop coin 48 into a coin box 49 when powdered material is dispensed from the machine. The thumper or vibrator mechanism 20 includes a spring-biased pivotally mounted arms means actuatable by the slide mechanism 16 on each of its forward movements to a cocked position and adapted when released to strike the container a blow which is effective to vibrate the container and loosen the powdered contents. In the particular embodiment herein disclosed, the thumper mechanism 20 includes an elongated striker arm 54 having a striker head 56, an upper arm portion 58 and a lower arm portion 60. A rigid elbow 62 connects the upper and lower arm portions. An abutment 64 is connected to and extends laterally from the lower end of the lower arm portion 60. This abutment 64 may define with the lower arm portion substantially a U-shape cross-section.

The thumper mechanism 20 also includes an elongated power arm 66 which has a downwardly extending projection or tab 68 formed on its lower end and a transverse power head 70 extending laterally from the upper end of the power arm 66 and defining therewith a U-shape cross-section. The power head 70 is adapted to engage the forward edge 72 of the elongated striker arm 54.

A bracket means 74 in the form of two parallel plate members 74A and 74B is attached to the vertical wall 28 by suitable means such as screws and is provided with a pivot pin 76 extending between the plate members 74A and 74B. The lower arm portion 60 of the striker arm 54 and the power arm 66 are pivotally mounted on the pivot pin 76. It will be observed from FIG. 2 that the lower arm portion of the striker arm 54 and the power arm are flat bar members disposed side by side with their opposing faces either in contact or very closely adjacently disposed with respect to each other.

A biasing means associated with the striker arm is provided to urge the striker arm to a striking position at the appropriate time. In that connection a tension spring 78 is connected between the wall 28, or alternatively the bracket means 74 , and the upper arm portion 58 of the striker arm to urge the striker arm 54 forwardly so that the striker head 56 would normally be in contact with the container 30. In making that contact, the striker head 56, which is a projection formed at the upper end of the striker arm, extends through an opening 80 in the wall 28 of the housing.

A torsion spring 82 in the form of a coil portion 84 and straight wire portion 86 and 88, extending from each end of the coil portion, is connected to pivot pin 76 having its coil portion wound around pivot pin 76. The end of wire portion 86 is connected to the plate member 74A such as by hooking into opening 90. The other wire portion 88 has its end connected to the lower end of power arm 66 such as by hooking the end into the opening 92.

Figure 2:
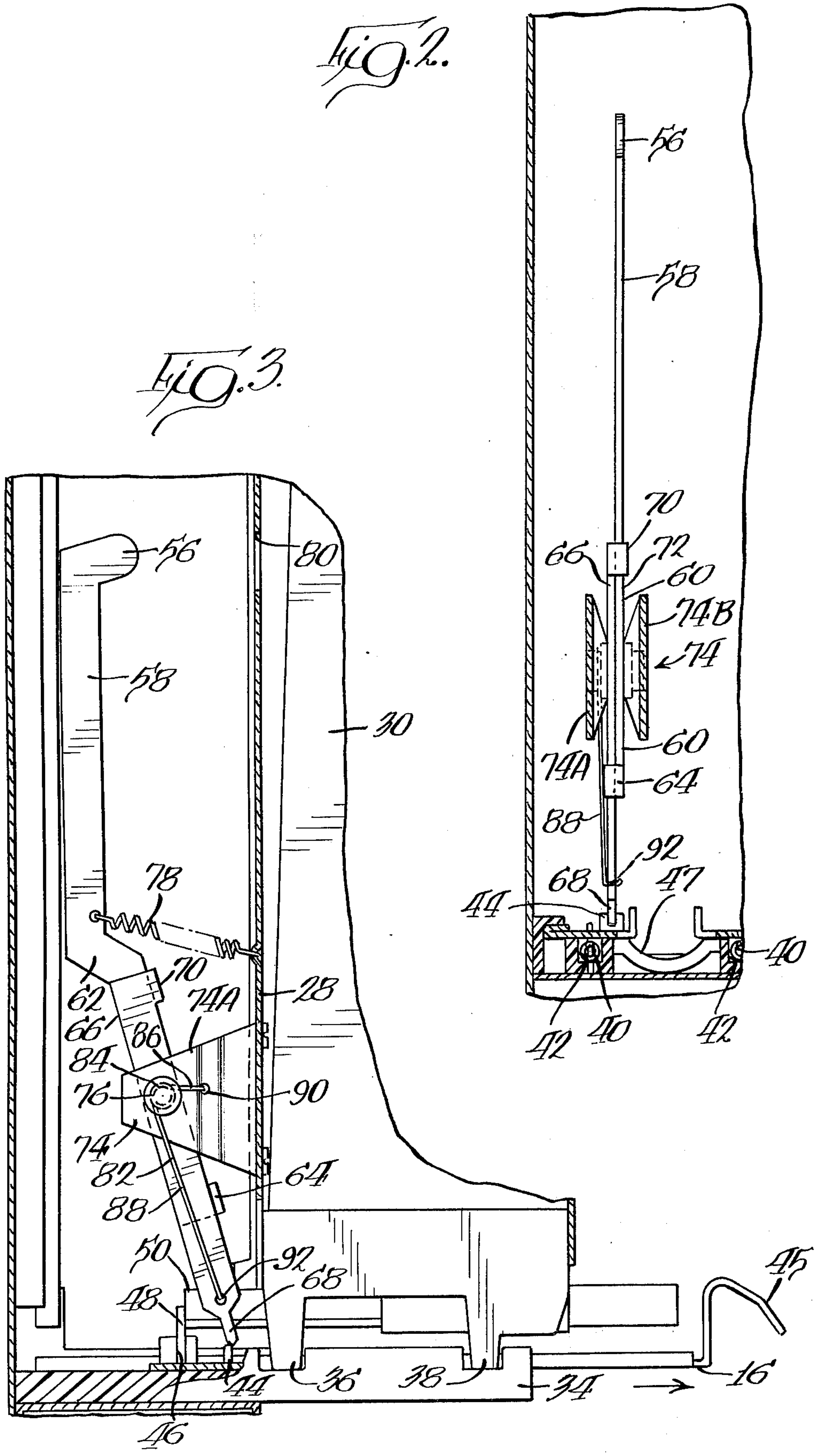
FIG. 2 is a fragmentary cross-sectional view in elevation taken substantially along line 2-2 of FIG. 1.

In operation, a coin 48 is deposited into vertical coin chute 18 and drops into coin pocket 46. The operator then pulls inverted U-shaped handle 45 outward (to the right as shown in FIGS. 1 and 2), causing the spring-loaded slide 16 to move forward. Upon the forward stroke of spring-loaded slide 16, coin 48 pushes the rearward end of stem 50 and the dispensing member 52 to which the stem 50 is attached to a forward position as shown in FIG. 3. During the forward stroke of slide 16, drive tab 44 will engage the projection 68 of power arm 66 causing upper arm portion 58 to move to a substantially vertical position with striker head 56 in a cocked position spaced from container 30.

When projection 68 on the power arm 66 reached a forward position, further forward movement of the slide 16 will cause the drive tab 44 to disengage from the power arm 66. Upon such disengagement tension spring 78 will drive elongated striker arm 54 from a cocked positon, as shown in FIG. 3, to strike the container 30 as shown in FIG. 1, thus vibrating the container and loosening the contents thereof.

During the forward movement of spring-loaded slide 16, power arm 66 and elongated striker arm 54 are pivoted in unison counterclockwise, so that power head 70 drivingly engages the forward edge 72 of elongated striker arm 54 above pin 76 and power arm 66 simultaneously drivingly engages abutment 64 below pivot pin 76 as shown in FIG. 3.

When the spring-loaded slide 16 is pulled to its maximum forward position, powdered comestible material contained in dispensing member 52 will be discharged through an opening (not shown) in the spring-loaded slide 16 and drop into a cup or drinking glass of hot water.

After the powdered comestible material has been dispensed, the operator releases handle 45 and the compression springs 40 of spring-loaded slide 16 return the slide back to a normal rearward or home position. Concurrently, the wall 45A of handle 45 will push the dispensing member 52 back to a normally closed position as shown in FIG. 1, in which position no powdered material is dispensed.

During the return stroke of spring-loaded slide 16, drive element 44 will engage the projection 68 of power arm 66 causing the power arrm to pivot clockwise as best shown in the phantom lines of FIG. 1. The power head 70 of power arm 66 does not engage the elongated striker arm 54 during clockwise rotation. When the projection 68 of the power arm reaches a rearward position, further rearward movement of spring-loaded slide 16 during the return stroke causes drive tab 44 to become disengaged from the power arm 66. Torsion spring 82 will then effect counterclockwise rotation of power arm 66 to its normal substantially vertical position, in which position power head 30 abuts the elongated striker arm 54.

Thus, it can be seen that the drive tab 44 disengages from power arm 66 at the forward position of the projection 68 to effect striking of container 30 and disengages from power arm 66 at the rearward position of the projection 68 during the return stroke of the spring-loaded slide 16 to effect automatic reset of thumper mechanism 20. Drive tab 44 only engages the projection 68 between the rearward and forward positions of power arm 66.

While a preferred embodiment of the invention has been disclosed, it will be appreciated that this has been shown by way of example only, and the invention is not to be limited thereto as other variations will be apparent to those skilled in the art and the invention is to be given its fullest possible interprettion within the terms of the following claims. What is claimed is:

1. In a vending machine for dispensing a powdered material from a container disposed therein, the combination comprising:

a housing adapted to have a container for powdered material supported therein;

a dispensing receptacle disposed in the lower portion of said housing and adapted to have the open end of a container seated thereon;

a slide mechanism disposed in said housing beneath the container which stores the powdered material to be dispensed, said slide mechanism being effective to actuate means for dispensing material from the container;

a vibrator mechanism for vibrating the container and its contents said vibrator mechanism being pivotally mounted within said housing;

pivotal mounting means for supporting said vibrator mechanism said pivotal mounting means being connected to a portion of said housing;

said vibrator mechanism including an elongated striker arm pivotally mounted on said pivotal mounting means, said striker arm being adapted to strike the container under the influence of spring biasing means when released from a cocked position;

interengaging means on said slide mechanism and said vibrator mechanism for cocking said vibrator mechanism with each forward movement. of said slide mechanism;

said slide mechanism being effective when moved to its forward position to automatically release the striker arm to strike the container.

2. The combination as defined in claim 1 wherein said vibrator mechanism includes a power arm pivotally mounted on said pivotal mounting means; and means releasably interconnecting said power arm and said striker arm.

3. The combination as defined in claim 2 wherein said interengaging means include a downwardly extending tab on the lower end of said power arm, and upwardly extending projection on said slide mechanism for engaging said tab during forward movement of said slide mechanism.

4. The combination as defined in claim 1 including a striker head formed on the end of said striker arm for striking the container.

5. The combination as defined in claim 2 including means operatively associated with said power arm urging said power arm to a normal substantially vertical position.

6. The combination as defined in claim 2 wherein said pivotal mounting means includes a pivot pin secured to a bracket member mounted on a wall of said housing, and said means releasably interconnecting said striker arm and said power arm includes a power head connected to and extending laterally from said power arm above said pivot pin and engaging a forward edge of said striker arm during the forward stroke, and an abutment below said pivot pin engaging a forward edge of the power arm during the forward stroke.

7. The combination as defined in claim 5 wherein said urging means includes torsion spring means disposed on said pivotal mounting means, one end of said torsion spring means being connected to said power arm.

* * * * *